(12) United States Patent
Pershin et al.

(10) Patent No.: US 9,369,405 B2
(45) Date of Patent: Jun. 14, 2016

(54) MAPPING COMPUTER RESOURCES TO CONSUMERS IN A COMPUTER SYSTEM

(71) Applicant: VMware, Inc., Palo Alto, CA (US)

(72) Inventors: Aleksey Pershin, Fremont, CA (US); Ilia Langouev, Santa Cruz, CA (US); Kishore Nadimpalli, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 176 days.

(21) Appl. No.: 14/309,227

(22) Filed: Jun. 19, 2014

(65) Prior Publication Data

US 2015/0372945 A1  Dec. 24, 2015

(51) Int. Cl.
*G06F 11/00* (2006.01)
*H04L 12/927* (2013.01)
*G06F 9/50* (2006.01)
*G06F 9/455* (2006.01)

(52) U.S. Cl.
CPC .......... *H04L 47/808* (2013.01); *G06F 9/45533* (2013.01); *G06F 9/5061* (2013.01)

(58) Field of Classification Search
CPC ............................ G06F 9/45533; G06F 9/5061
See application file for complete search history.

(56) References Cited

U.S. PATENT DOCUMENTS

| | | | | |
|---|---|---|---|---|
| 6,807,557 B1 * | 10/2004 | Novaes | ................. | G06F 9/5061 707/E17.032 |
| 8,155,146 B1 * | 4/2012 | Vincent | ............... | H04L 12/4633 370/473 |
| 8,813,225 B1 * | 8/2014 | Fuller | ..................... | H04L 63/10 726/23 |
| 2015/0188777 A1 * | 7/2015 | Frost | ....................... | H04L 67/34 709/223 |

* cited by examiner

*Primary Examiner* — Charles Ehne
(74) *Attorney, Agent, or Firm* — Patterson & Sheridan LLP

(57) ABSTRACT

Mapping computer resources to consumers in a computer system is described. In an example, a method of mapping computer resources to consumers in a computer system includes: receiving tags assigned to the computer resources at a resource manager executing in the computer system, where the resource manager: identifies a first tag assigned to a first computer resource; determines whether a first consumer is associated with the first tag; enables the first consumer to access the first computer resource if the first consumer is associated with the first tag; and prevents the first consumer from accessing the first computer resource if the first consumer is not associated with the first tag.

18 Claims, 8 Drawing Sheets

MAPPING COMPUTER RESOURCES TO CONSUMERS IN A COMPUTER SYSTEM

BACKGROUND

Modern computing environments that support execution of virtual machines running in computer systems can employ disaster recovery management solutions for disaster protection. In a typical disaster recovery management scheme, storage units associated with a group of virtual machines executing on hosts at a production site are replicated to a recovery site. In case of failure of at the production site, the virtual machines can be failed over to hosts at the recovery site. In the failover process, replicated storage units can be mapped to the appropriate hosts. That is, the failover process must maintain a consistent topology between hosts and storage units from the production site to the recovery site. Otherwise, when the virtual machines are brought online at the recovery site, some virtual machines will not have access to the same storage units as at the production site, causing degradation or failure of the virtual machines.

One technique for recreating the host-storage unit topology at the recovery site is to mount every recovered storage unit on every host at the recovery site. The hosts, however, can have practical limits on the number of mounted storage units. The number of storage units under protection in some environments cart easily exceed the limit on the allowed number of mounted storage units. Moreover, mounting every storage unit on every host at the recovery site is inefficient and can thwart any logical division of hosts and storage units established by administrators at the production site. Further, mapping storage units at the recovery site in an identical fashion to the protected site is often impractical. The protected and recovery sites can have different capacities (e.g., the recovery site often has a smaller capacity than the protected site). Thus, a one-to-one match between a mapping of storage units and hosts at the protected site and a mapping of storage units and hosts at the recovery site is not always possible.

DETAILED DESCRIPTION

Figure 1:
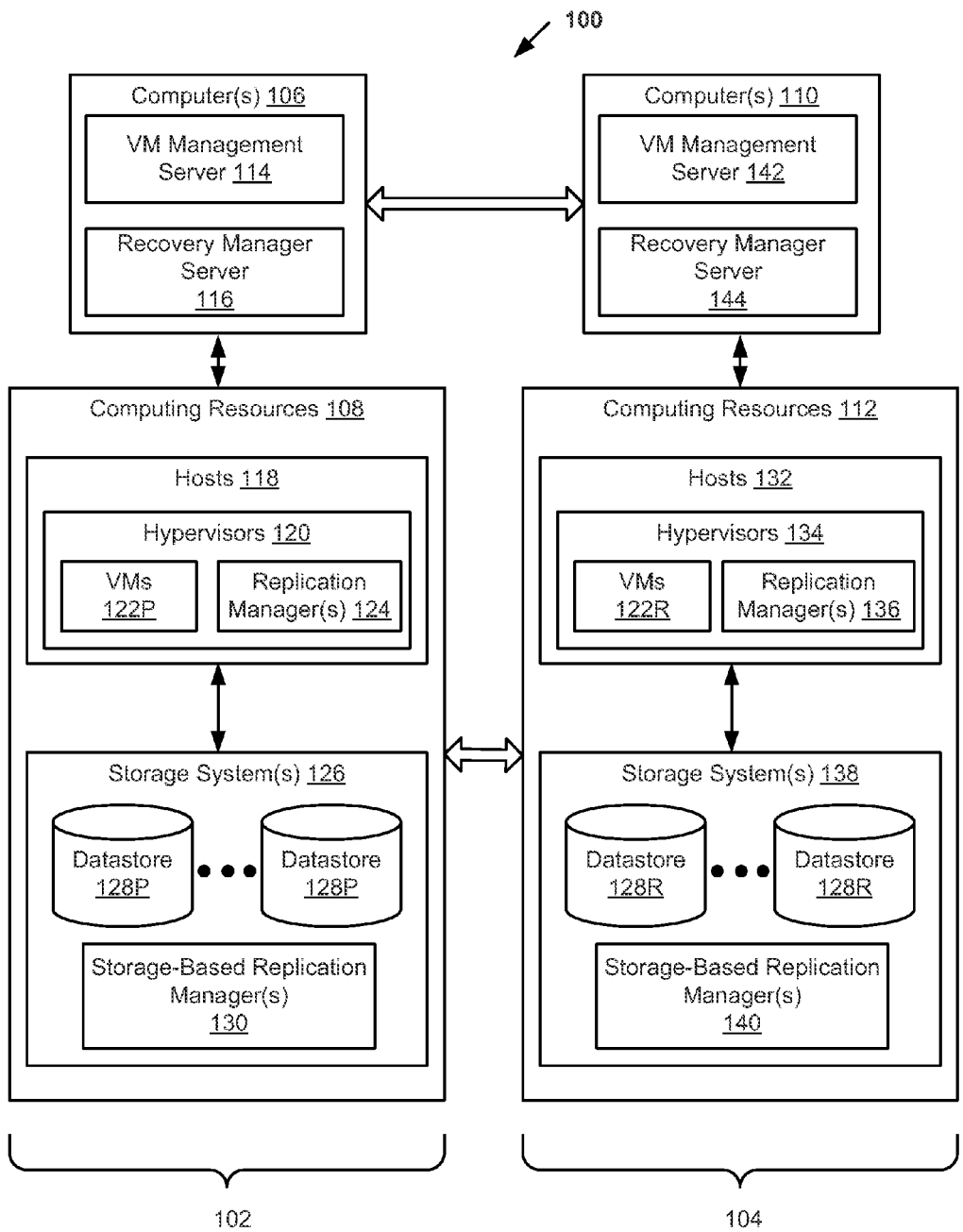
FIG. 1 is a block diagram depicting a computer system according to an embodiment.

FIG. 1 is a block diagram depicting a computer system 100 according to an embodiment. Computer system 100 includes a site 102 and a site 104. Sites 102 and 104 include collections of computing resources that are physically and/or logical divided within computer system 100. Site 102 includes protected virtual machines (VMs) executing on production computing resources. Protected VMs can be transferred from operating on the production computing resources to recovery computing resources at site 104. The protected VMs can be transferred between sites 102 and 104 in response to unplanned migration (e.g., resource failure, disaster, etc.) or planned migration (generally referred to as migration). Site 102 can be referred to as a "production site", and site 104 can be referred to as a "recovery site". Protected VMs on site 102 can be failed over to site 104. Protected VMs on site 104 can be failed back to site 102. The terms "failed over" and "failed back" encompass both planned and unplanned migrations of VMs between sites 102 and 104.

Site 102 includes computer(s) 106 and computing resources 108. Computer(s) 106 include one or more computers that execute a VM management server 114 and a recovery management server 116. Computing resources 108 can include computer systems, storage systems, networks and associated devices, and the like, such as host computers ("hosts 118") and at least one storage system ("storage system(s) 126"). Hosts 118 execute hypervisors 120. For example, each of hosts 118 can execute one of hypervisors 120. Hypervisors 120 provide a software interface layer that abstracts computing resources hardware into virtualized hardware, enabling sharing of the computing resource hardware among virtual machines. Each of hypervisors 120 can be a "bare-metal" hypervisor executing directly on a host, such as vSphere® ESXi™ commercially available from VMware, Inc. of Palo Alto, Calif. Alternatively, one or more of hypervisors 120 can execute on top of an operating system (OS), which is executing on a host.

Hypervisors 120 support execution of VMs 122P. Hypervisors 120 can include one or more replication managers ("replication manager(s) 124"). Replication manager(s) 124 can control replication of VMs between sites 102 and 104. Some replication managers can replicate individual VMs to existing datastores. Other replication managers can replicate the VMs by replicating the datastores on which the VMs reside. When datastores are replicated, a resource-consumer mapping process according to examples set forth herein can be used. In the examples described herein, replication manager(s) 124 replicate VMs by replicating the datastores on which the VMs reside. Storage system(s) 126 can include one or more mass storage devices, associated networks, and the like. Storage system(s) 126 store datastores 128P. Datastores 128P are logical units of storage having files for implementing VMs 122P. Each datastore 128P can include, for example, virtual disks, VM configuration files, VM snapshot files, and the like. Datastores 128P are abstracted from the underlying mass storage of storage system(s) 126. For example, a given datastore 128P can be stored on one or more logical units (LUNs) of storage system(s) 126. Alternatively, a given LUN of storage system(s) 126 can store one or more datastores 128P. In an embodiment, storage system(s) 126 include storage-based replication manager(s) 130. Storage-based replication manager(s) 130 can control replication of datastores and associated VMs between sites 102 and 104. Storage-based replication manager(s) 130 can operate together with replication manager(s) 124, in place of replication manager(s) 124, or can be omitted in favor of only replication manager(s) 124.

Site 104 includes computer(s) 110 and computing resources 112. Computer(s) 110 include one or more computers that execute a VM management server 142 and a recovery management server 144. Computing resources 112 can include computer systems, storage systems, networks and associated devices, and the like, such as host computers ("hosts 132") and storage system(s) 138. Hosts 132 execute hypervisors 134 and can be configured similarly to hosts 118 and hypervisors 120. Hypervisors 134 can support execution of VMs 122R. Hypervisors 134 can include one or more replication managers ("replication manager(s) 136"). Storage system(s) 138 can include one or more mass storage devices, associated networks, and the like. Storage system(s) 138 store datastores 128R. In an embodiment, storage system(s) 138 includes storage-based replication manager(s) 140.

In operation, computing resources 108 replicate datastores to computing resources 112. Datastores 128P are first copies or "production copies" of the datastores, and datastores 128R are second copies or "recovery copies" of the datastores (e.g., replicas of the production copies maintained at production site 102). In an embodiment, replication managers 124 and 136 perform datastore replication between computing resources 108 and 112. For example, the vSphere® ESXi™ hypervisor includes a built-in, hypervisor-based replication feature. In another embodiment, storage-based replication managers 130 and 140 perform datastore replication between storage system(s) 126 and storage system(s) 138. In another embodiment, replication managers 124 and 136 replicate some datastores, and storage-based replication managers 130 and 140 replicate other datastores. In general, replication managers 124 and 136 and/or storage-based replication managers 130 and 140 maintain two copies of the datastores, namely, datastores 128P and datastores 128R. Datastores 128R are typically not accessible until after failover. During failover, datastores 128R are mounted on hosts at recovery site 104 and become accessible.

VM management servers 114 and 142 manage hosts 118 and 132, respectively. An administrator can use the VM management servers to configure the hypervisors, the datastores, the VMs, and the replication managers (if present). Recovery manager servers 116 and 144 manage disaster recovery (DR) for computer system 100. An administrator can use recovery manager servers 116 and 144 to establish protected group(s) of VMs and associated datastores, establish recovery plans, initiate migrations, and the like.

An administrator can use VM management server 114 to assign tags to hosts 118 and datastores 128P. The VM management server 114 can assign each datastore and each host at least one tag. The tags can be generic (e.g., Tag1, Tag2, etc.), or can have some meaning established by an administrator (e.g., "finance", "human resources", "legal", etc.). Tag assignments can describe a topology of hosts 118 and datastores 128P, and this topology can be discovered by recovery manager server 116. For example, a host associated with a "finance" function can be assigned a "finance" tag. Each datastore attached to the host with the "finance" tag can be assigned the "finance" tag to represent the host-datastore association. Some datastores can be attached to multiple hosts having different functions and thus can have more than one tag (e.g., a datastore attached to a host with at least a "finance" tag, and a host with at least a "legal" tag, can be assigned both "finance" and "legal" tags). Likewise, some hosts can be attached to multiple datastores supporting different functions and thus can have more than one tag (e.g., a host can perform both "legal" and "human resources" functions and can be attached to a datastore with at least a "legal" tag and to a datastore with at least a "human resources" tag). In general, an administrator can use VM management server 114 to assign tags that describe various one-to-many, many-to-one, and/or many-to-many relationships between hosts 118 and datastores 128P.

An administrator can use VM management server 142 to establish tags for hosts 132. Before failover, an administrator cannot establish a topology between hosts 132 and datastores 128R and hence the administrator cannot assign tags to datastores 128R. As discussed above, datastores 128R are not accessible before failover. Tag assignments can describe a configuration of hosts 132, which can be used by recovery manager server 144. Hosts 132 are not necessarily configured the same as hosts 118, and hence an administrator can assign tags differently to hosts 132 than hosts 118. For example, hosts 132 can include fewer host computers than hosts 118. In such case, some of hosts 132 may perform multiple functions in case of failover, where such functions are separately performed by hosts 118. For example, hosts 118 can have a host computer for "legal" function and a host computer for "finance" function, whereas hosts 132 can include a single computer that will perform both "legal" and "finance" functions in case of failover. In general, the topology of hosts 132 and datastores 128R after failover can be different than the topology of hosts 118 and datastores 128P, which can be reflected in the tag assignments for hosts 132.

Before failover, VMs 122P are operating and VMs 122R are not operating (or are otherwise not conflicting with VMs 122P). An administrator has established a specific topology for hosts 118 and datastores 128P and, through recovery manager server 116, has established one or more protection groups. An administrator, through VM management server 114, has assigned tags to datastores 128P and hosts 118 representative of the established topology. An administrator has established a configuration for hosts 132 and, through VM management server 142, has assigned tags to hosts 132 representative of the configuration. Before migration, an administrator usually cannot associate datastores 128R to hosts 132. Rather, recovery manager server 144 associates datastores 128R and hosts 132 during failover.

Before failover, some of VMs 122P are not operating. For purposes of clarity by example, assume all VMs 122P are being ailed over and are not operating. Recovery manager servers 116, 144 cooperate to implement a disaster recovery (DR) workflow according to a defined recovery plan. As described above, recovery manger servers 116, 144 maintain data representing a topology of hosts 118 and datastores 128P, as well as a configuration of hosts 132. The recovery manager servers 116, 144 maintain the topology and configuration data outside of the replication process so that the data is available during failover. Recovery manager servers 116, 144 can obtain tags assigned to datastores and/or hosts. In particular, with respect to failover from protection site 102 to recovery site 104, recovery manager server 144 identifies tags assigned to datastores 128P. Recovery manager server 144 assigns the tags to datastores 128R such that each datastore replica receives the same tag(s) as the corresponding copy of the datastore at protection site 102. Recovery manager server 144 attaches datastores 128R to hosts 132 by matching the tags between datastores 128R and hosts 132. For example, recovery manager server 144 can identify a datastore in datastores 128P having a "legal" tag, transfer the "legal" tag to a corresponding datastore replica in datastores 128R, and attach the datastore replica to all hosts in hosts 132 having the "legal" tag.

The resulting topology of datastores 128R and hosts 132 after failover may be the same as the topology for datastores 128P and hosts 118, or may be a different topology. For example, if the configuration of hosts 132 is different than the configuration of hosts 118, then the resulting topology within computing resources 112 after failover will be different than that within computing resources 108.

After recovery manager server 144 attaches datastores 128R to hosts 132, VMs 122R can be activated, completing the failover process. Recovery manager server 144 achieves the failover without resorting to inefficient mounting of every datastore 128R to every host 132. Recovery manager server 144 can fail over a large number of VMs and associated datastores without regard to any limit to the allowed number of mounted storage units on hosts 132. In addition, recovery manager servers 116, 144 maintain logical division of hosts and datastores as initially established by administrator(s). Administrators can manage sites 102 and 104 independently. One administrator can setup a topology for hosts 118 and datastores 128P, and another administrator can setup a configuration for hosts 132. During failover, an administrator does not have to resort to manual mapping of datastores to hosts within computing resources 112.

Figure 2A:
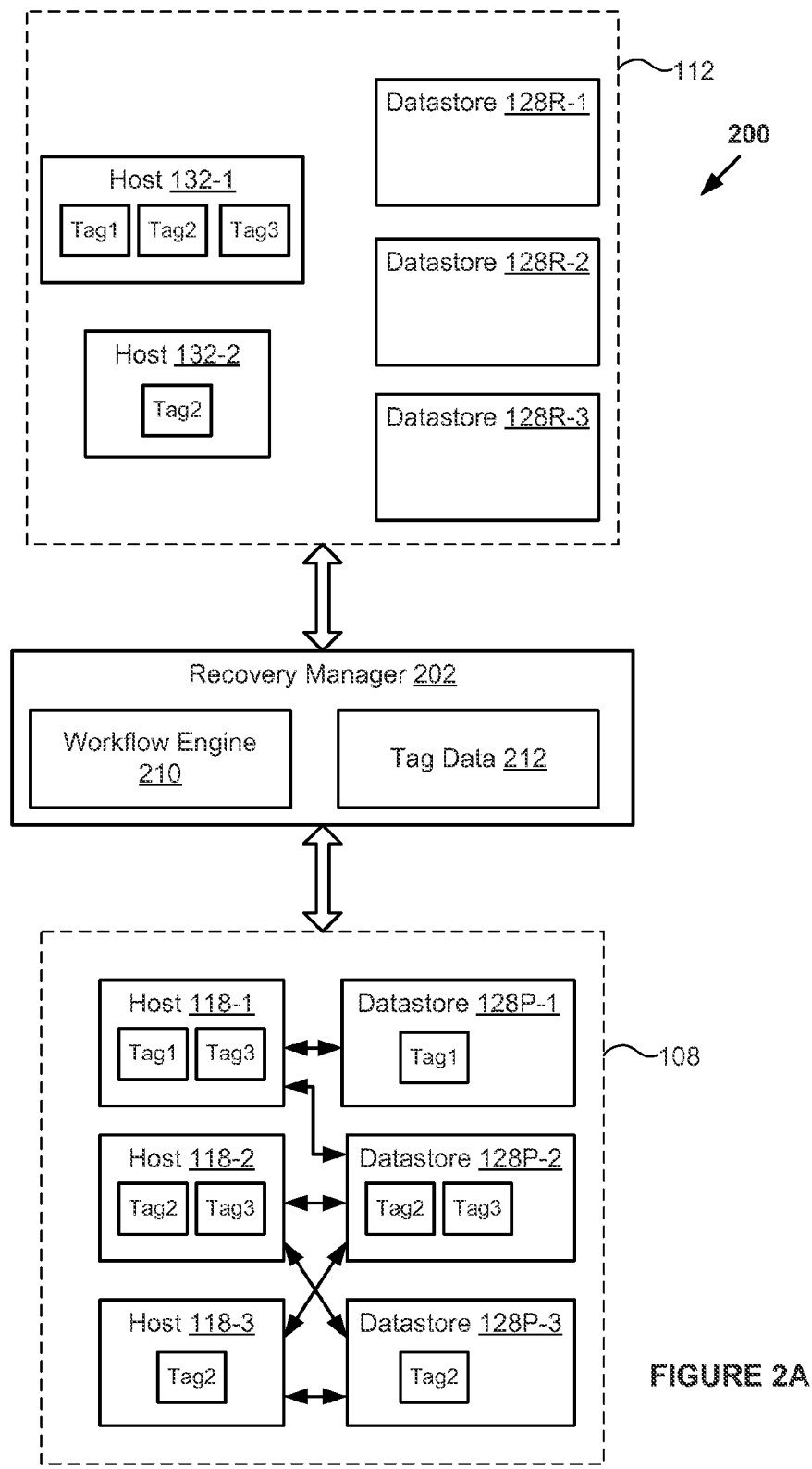
FIGS. 2A and 2B are block diagrams depicting an example system of hosts and datastores in a computer system.
Figure 2B:
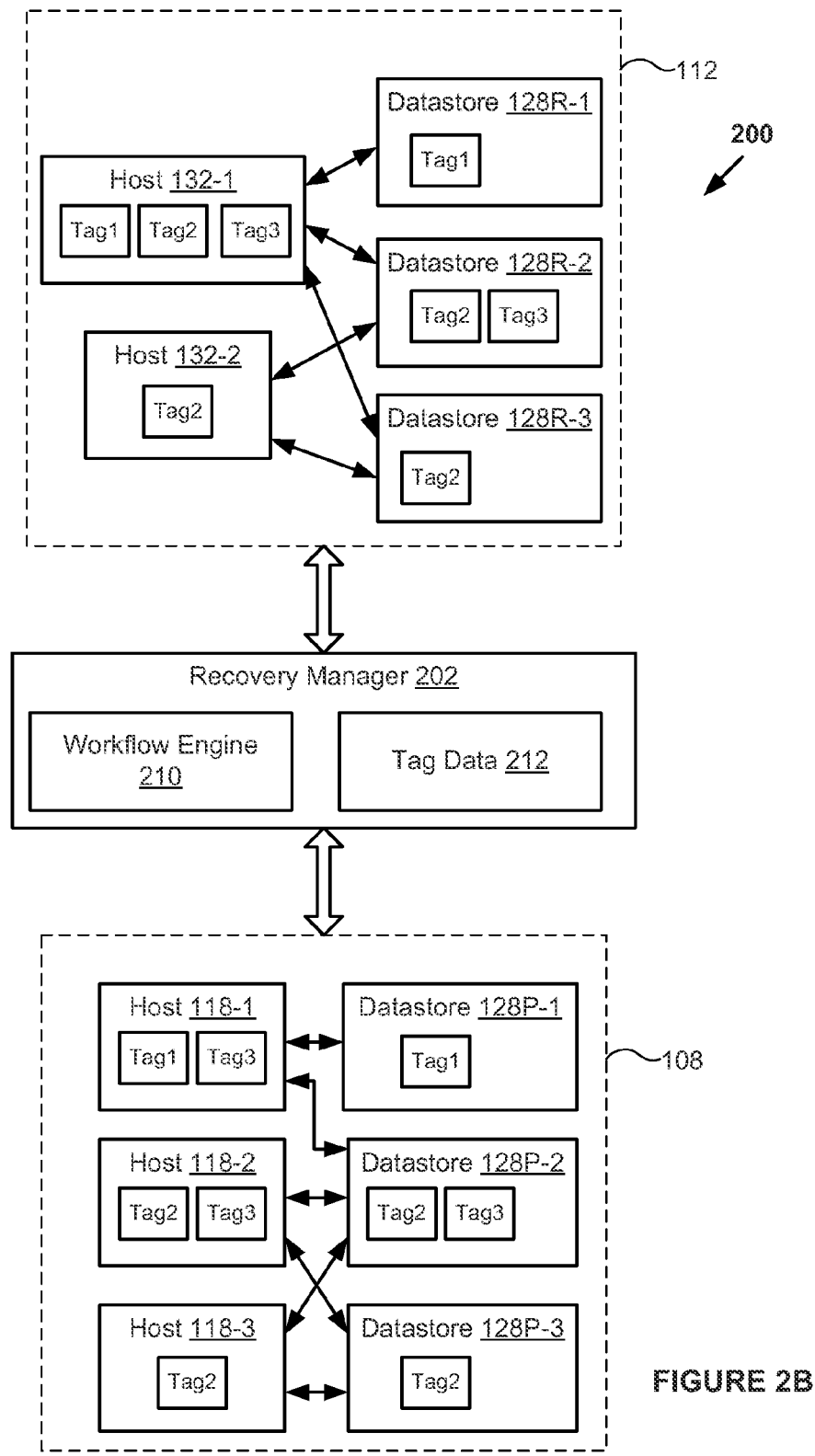

FIGS. 2A and 2B are block diagrams depicting an example system 200 of hosts and datastores in a computer system. Elements of FIGS. 2A and 2B that are the same or similar to those of FIG. 1 are designated with identical reference numerals. FIG. 2A represents state of system 200 prior to failover, and FIG. 2B represents state of system 200 after failover. System 200 includes computing resources 108, computing resources 112, and a recovery manager 202. Recovery manager 202 can be implemented using one or more servers, such as recovery manager servers 116, 144. Recovery manager 202 can include a workflow engine 210 to manage failover of VMs from computing resources 108 to computing resources 112. During failover, recovery manager 202 obtains tag data 212 associated with hosts and datastores (e.g., tags for datastores 128P and tags for hosts 132).

As shown in FIG. 2A, computing resources 108 include hosts 118-1 through 118-3, and datastores 128P-1 through 128P-3. Host 118-1 is assigned "Tag1" and "Tag3" tags; host 118-2 is assigned "Tag2" and "Tag3" tags, and host 118-3 is assigned a "Tag2" tag. Datastore 128P-1 is assigned "Tag1" tag; datastore 128P-2 is assigned "Tag2" and "Tag3" tags, and datastore 128P-3 is assigned "Tag2" tag. The tag assignments represent a topology where datastore 128P-1 is attached to host 118-1, datastore 128P-2 is attached to all three hosts 118-1 through 118-3, and datastore 128P-3 is attached to hosts 118-2 and 118-3.

Computing resources 112 include hosts 132-1 and 132-2, and datastores 128R-1 through 128R-3. Datastores 128R-1 through 128R-3 are respective copies of datastores 128P-1 through 128P-3. Before failover, datastores 128R-1 through 128R-3 are unattached and do not have any tag assignments. Host 132-1 is assigned "Tag1", "Tag2", and "Tag3", and host 132-2 is assigned "Tag2".

As shown in FIG. 2B, during failover, recovery manager 202 transfers tags from datastores 128P-1 through 128P-3 to datastores 128R-1 through 128R-3, respectively. Recovery manager 202 then attaches datastores 128R-1 through 128R-3 to hosts 132-1 and 132-2 by matching tags. In the example, recovery manager 202 attaches datastore 128R-1 to host 132-1, attaches datastore 128R-2 to hosts 132-1 and 132-2, and attaches datastore 128R-3 to hosts 132-1 and 132-2.

While aspects of the mapping process have been described with respect to failover, it is to be understood that the mapping process can also be applied to VM migration in general, including failback of VMs from site 104 to site 102. Further, while specific reference has been made to VM management servers 114 and 142 and recovery manager servers 116 and 144 as performing particular operations, it is to be understood that any operation can be performed by either of the servers or both of the servers in cooperation. Further, while the mapping process has been described with respect to datastores and host computers, the mapping process can be generally applied to any computer resources and consumers of computer resources ("consumers") using a resource manager executing in a computer system. For example, an administrator can establish a topology of consumers and resources on one set of computing resources, and a configuration of consumers on another set of computing resources. An administrator through VM management server(s) can assign tags to the consumers and resources. When resources need to be attached to consumers, server(s) can identify tags assigned to resources, enable consumers with like tags to access resources, and prevent consumers with unlike tags from accessing resources.

Returning to FIG. 1, in another example, tags can be assigned from tag categories. An administrator can use VM management server 114 to assign tag categories to protection groups of datastores 128P. The tag categories can be generic (e.g., TagCategory1, TagCategory2, etc.) or can have some meaning established by an administrator (e.g., "EnterpriseAdministrator", "LocalAdministrator", etc. dictating administrator level access). Tag category assignments can describe different scopes within a topology of hosts and datastores. For example, a cluster of hosts and a protection group of datastores can be assigned an "EnterpriseAdministrator" tag category indicating that only enterprise administrators or above can access those hosts and datastores. Another cluster of hosts and another protection group of datastores can be assigned a "LocalAdministrator" tag category indicating that only local administrators or above can access those hosts and datastores. Other types of tag categories can be defined based on other types of scope, such as location (e.g., "Office1", "Office2", etc.), Some datastores can be attached to hosts with tags in different tag categories and thus can have tags from more than one tag category. Likewise, some hosts can be attached to datastores in different protection groups and thus can have tags from more than one tag category.

An administrator can use VM management server 142 to assign a tag or tags from one or more tag categories to hosts 132. An administrator cannot assign tags from any tag category to datastores 128R. Hosts 132 may not be configured into the same clusters as hosts 118, and thus an administrator can assign tags differently to hosts 132 than hosts 118.

Figure 3A:
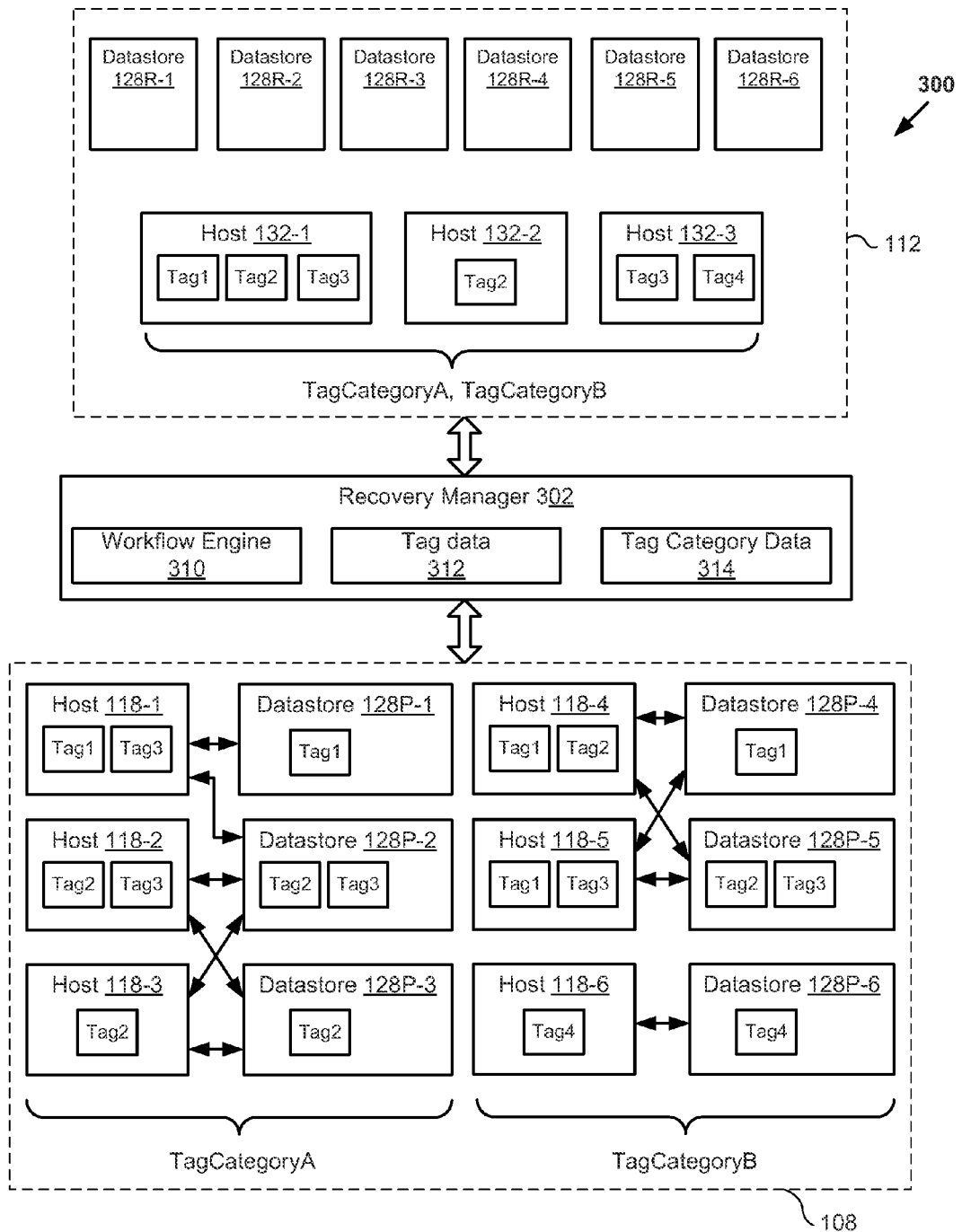
FIGS. 3A and 3B are block diagrams depicting an example system of hosts and datastores in a computer system.
Figure 3B:
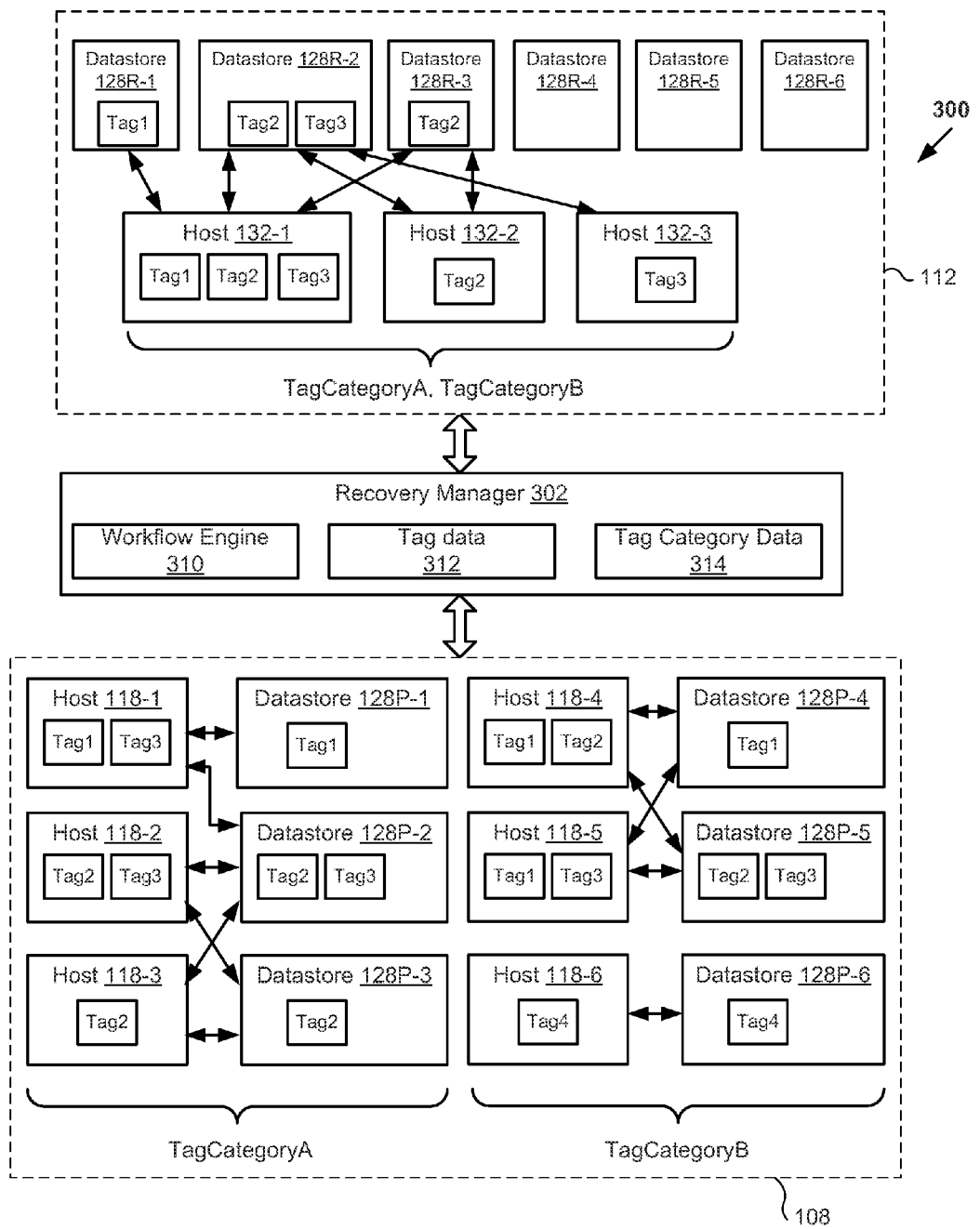

Assignment of tag categories allows for scoped failover, e.g., failover of some protection groups in favor of other protection groups, failover over of higher priority protection groups before lower priority protection groups, or the like. FIGS. 3A and 3B are block diagrams depicting an example system 300 of hosts and datastores in a computer system. Elements of FIGS. 3A and 3B that are the same or similar to those of FIG. 1 are designated with identical reference numerals. FIG. 3A represents state of system 300 prior to failover or protection groups assigned tag category "TagCategoryA", and FIG. 3B represents state of system 300 after failover of protection groups assigned tag category "TagCategoryA". System 300 includes computing resources 108, computing resources 112, and a recovery manager 302. Recovery manager 302 can be implemented using one or more servers, such as recovery manager servers 116, 144. Recovery manager 302 can include a workflow engine 310 to manage failover of VMs from computing resources 108 to computing resources 112. During failover, recovery manager 302 obtains tag data 312 associated with hosts and datastores (e.g., tags for datastores 128P and tags for hosts 132). Recovery manager 302 can also obtain tag category data 314 associated with protection groups of datastores.

As shown in FIG. 3A, computing resources 108 include hosts 118-1 through 118-6, and datastores 128P-1 through 128P-6. Hosts 118-1 through 118-3 are in a first cluster, and hosts 118-4 through 118-6 are in a second cluster. Datastores 128P-1 through 128P-3 are in a first protection group, and datastores 128P-4 through 128P-6 are in a second protection group. Host 118-1 is assigned "Tag1" and "Tag3" from tag category "TagCategoryA"; host 118-2 is assigned "Tag2" and "Tag3" from tag category "TagCategoryA"; host 118-3 is assigned "Tag2" from tag category "TagCategoryA"; host 118-4 is assigned "Tag1" and "Tag2" from tag category "TagCategoryB"; host 118-5 is assigned "Tag1" and "Tag3" for tag category "TagCategoryB"; and host 118-6 is assigned "Tag4" from "TagCategoryB". Datastore 128P-1 is assigned "Tag1" from tag category "TagCategoryA"; datastore 128P-2 is assigned "Tag2" and "Tag3" from tag category "TagCategoryA"; datastore 128P-3 is assigned "Tag2" from tag category "TagCategoryA"; datastore 128P-4 is assigned "Tag1" from tag category "TagCategoryB"; datastore 128P-5 is assigned "Tag2" and "Tag3" from tag category "TagCategoryB"; and datastore 128P-6 is assigned "Tag4" from tag category "TagCategoryB". An administrator creates a first protection group with TagCategoryA, and a second protection group with TagCategoryB, placing the corresponding datastores in the corresponding protection groups. The tag assignments represent a topology where, for the first cluster and protection group, datastore 128P-1 is attached to host 118-1, datastore 128P-2 is attached to datastores 118-1 through 118-3, and datastore 128P-3 is attached to hosts 118-2 and 118-3. For the second cluster and protection group, datastore 128P-4 is attached to hosts 118-4 and 118-5, datastore 128P-5 is attached to hosts 118-4 and 118-5, and datastore 128P-6 is attached to host 118-6.

Computing resources 112 include hosts 132-1 through 132-3, and datastores 128R-1 through 128R-6. Datastores 128R-1 through 128R-6 are respective copies of datastores 128P-1 through 128P-6. Before failover, datastores 128R-1 through 128R-6 are unattached and do not have any tag assignments. Host 132-1 is assigned "Tag1", "Tag2", and "Tag3" from "TagCategoryA", host 132-2 is assigned "Tag2" from "TagCategoryA", and host 132-3 is assigned "Tag3" from "TagCategoryA".

As shown in FIG. 3B, during failover of the first protection group of datastores 128P-1 through 128P-3, recovery manager 302 transfers tags from datastores 128P-1 through 128P-3 to datastores 128R-1 through 128R-3. In the example, recovery manager 302 does not failover the second protection group of datastores 128P-4 through 128P-6. Recovery manager 302 attaches datastore 128R-1 to host 132-1, attaches datastore 128R-2 to hosts 132-1 through 132-3, and attaches datastore 128R-3 to hosts 132-1 and 132-3.

In this manner, tag categories can be employed to limit the scope of failover. In the example of FIGS. 3A, 3B, recovery manager 302 only processes tags associated with datastores in TagCategoryA. Recovery manager 302 can ignore tags associated with datastores in other tag categories (e.g., TagCategory B), even if those datastores require failover (which can occur in a later step if at all). Although the example shows failover of a single tag category, recovery manager 302 can failover protection groups associated with multiple tag categories at one time. While computing resources 112 are shown as having only one cluster of hosts 132-1 through 132-3 with tags assigned from both tag categories, computing resources 112 can have multiple host clusters, each assigned tags from one or more tag categories. The example shows that tags can have some overlap between tag categories (e.g., "Tag1" in "TagCategoryA" and "Tag1" in "TagCategoryB"). In other examples, tags can be mutually exclusive as between tag categories.

Figure 4:
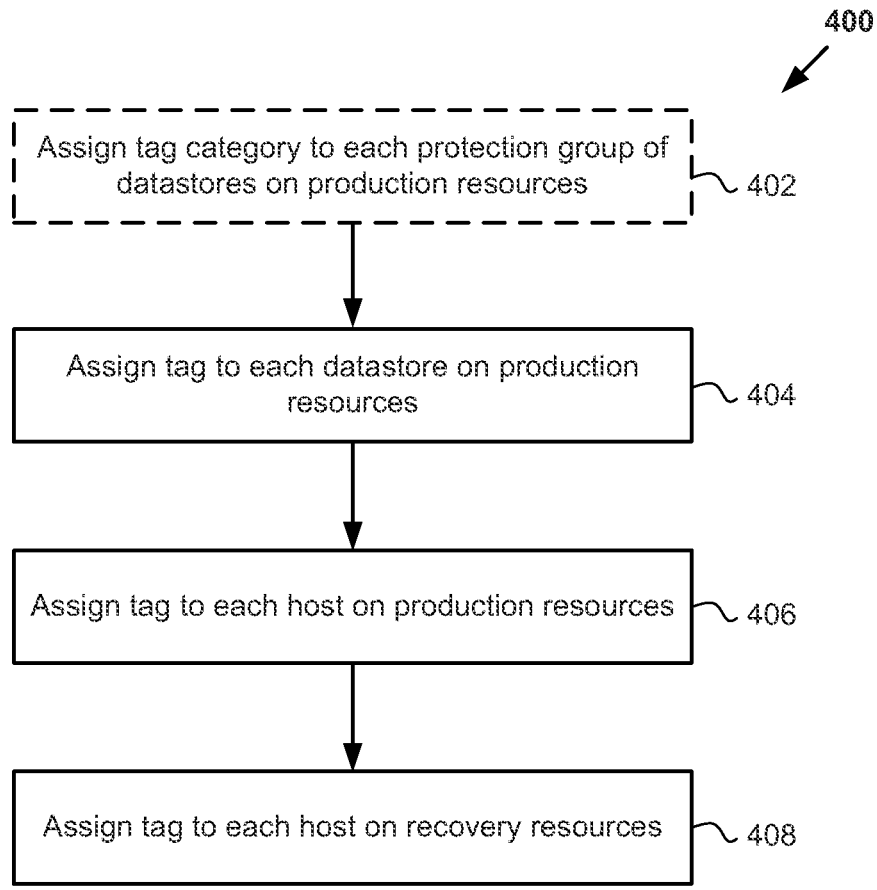
FIG. 4 is a flow diagram depicting a method of representing topology of hosts and datastores in a computer system according to an embodiment.

FIG. 4 is a flow diagram depicting a method 400 of representing topology of hosts and datastores in a computer system according to an embodiment. Method 400 may be understood with respect to system 100 of FIG. 1. In one example, method 400 includes assignment of tag categories to protection groups. In another example, method 400 omits the assignment of tag categories. Steps of method 400 related to assignment of tag categories are shown with dashed-lines and are optional. The steps of method 400 can be performed by an administrator through a server, such as VM management servers 114, 142, and/or recovery manager servers 116, 144.

The method 400 includes step 402, where an administrator assigns a tag category to each protection group of datastores 128P on production resources (e.g., computing resources 108). At step 404, an administrator assigns a tag to each datastore on production resources (e.g., computing resources 108). At step 406, an administrator assigns a tag to each host on production resources (e.g., computing resources 108). At step 408, an administrator assigns a tag to each host on recovery resources (e.g., computing resources 112). For purposes of clarity by example, the steps of method 400 have been described with respect to datastores and hosts. Method 400 is more generally applicable to assigning tag categories and/or tags to resources and consumers, of which datastore resources and host consumers are specific examples. In addition, although method 400 is described in the context of disaster recovery, method 400 is applicable to other workflows where a topology of resources and consumers need to be created to correspond to another topology of resources and consumers.

Figure 5:
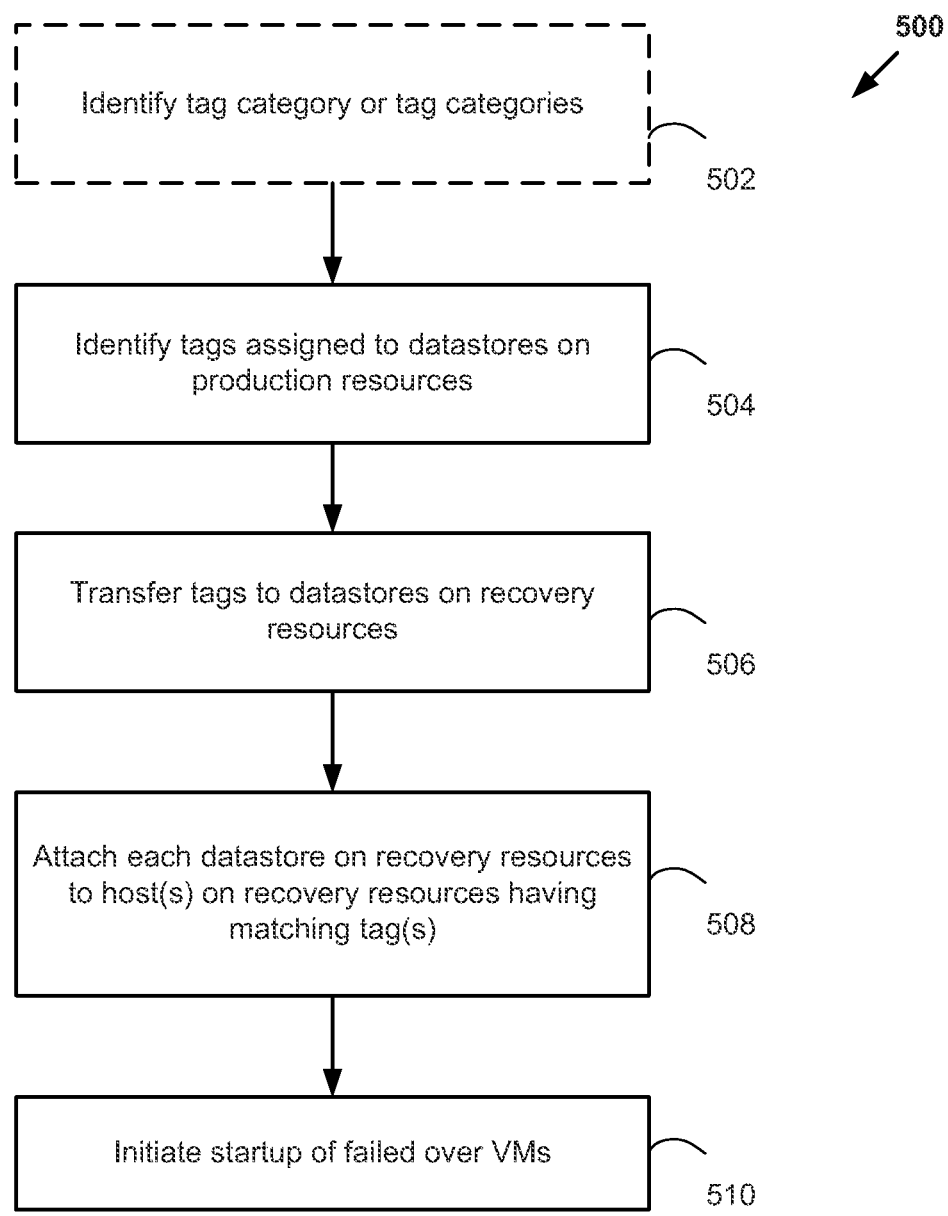
FIG. 5 is a flow diagram depicting a method of mapping datastores to hosts in a computer system according to an embodiment.

FIG. 5 is a flow diagram depicting a method 500 of mapping datastores to hosts in a computer system according to an embodiment. Method 500 may be understood with respect to system 100 of FIG. 1. Method 500 begins at optional step 502, where recovery manager server 116, 144 identifies a tag category or tag categories associated with resources to failover. If optional step 502 is performed, the remaining steps of method 500 are performed within the scope defined by the tag category or tag categories (i.e., the tags exist within the tag category or tag categories). At step 504, recovery manager server 116, 144 identifies tags assigned to datastores 128P on production resources (e.g., computing resources 108). At step 506, recovery manager server 116, 144 transfers tags to datastores 128R on recovery resources (e.g., computing resources 112). At step 508, recovery manager server 144 attaches each datastore on recovery resources to one or more hosts on recovery resources that have matching tag(s). At step 510, recovery manager server 144 initiates startup of failed over VMs.

Figure 6:
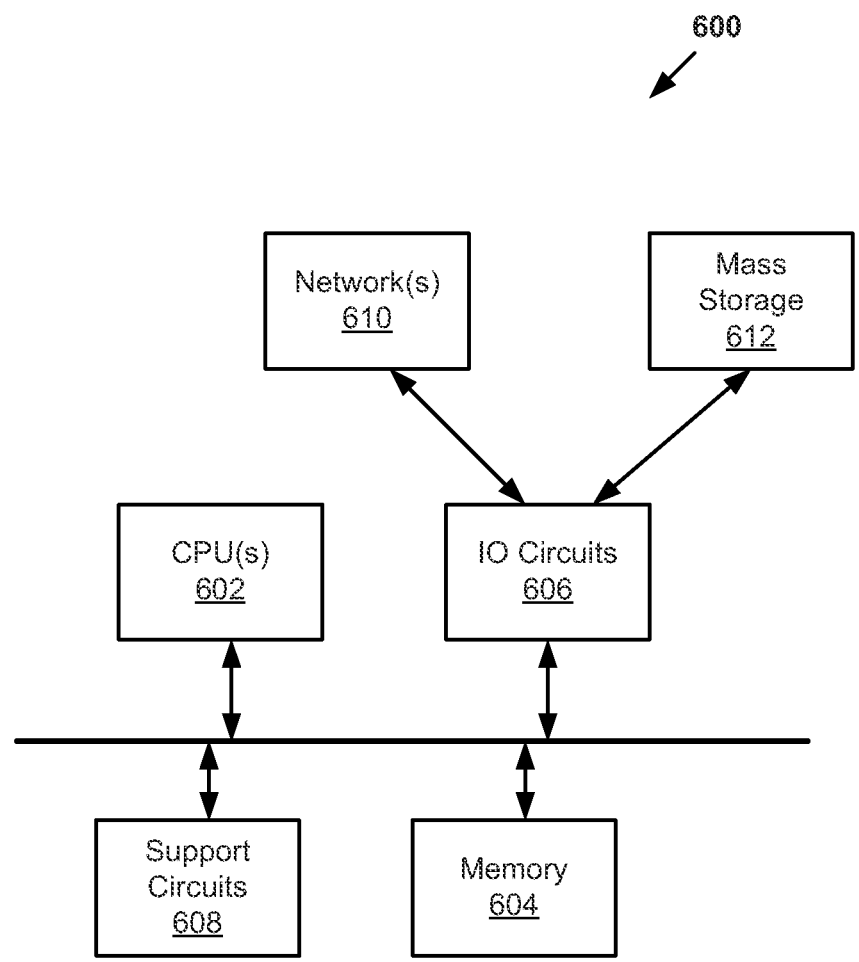
FIG. 6 is a block diagram depicting computing resources according to an example implementation.

FIG. 6 is a block diagram depicting computing resources 600 according to an example implementation. Computing resources 600 can be used to implement any of the computing resources described above in FIGS. 1-5. Computing resources 600 include one or more central processing units (CPUs) 602, memory 604, input/output (IO) circuits 606, various support circuits 608, network(s) 610, and mass storage 612. Each of CPUs 602 can include any microprocessor known in the art and can execute instructions stored on computer readable storage, such as memory 604 or mass storage 612. Memory 604 can include various volatile and/or non-volatile memory devices, such as random access memory (RAM), read only memory (ROM), and the like. Mass storage 612 can include various persistent storage devices, such as hard disc drives, solid state disk drives, and the like. Instructions for performing the various methods and techniques described above can be stored in memory 604 and/or mass storage 612 for execution by CPUs 602. IO circuits 606 facilitate access to networks 610, mass storage 612, and like systems for CPUs 602. Support circuits 608 include various circuits used to support operation of a computer system as known in the art.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of mapping computer resources to consumers in a computer system, comprising:
   receiving tags assigned to the computer resources at a resource manager executing in the computer system, where the resource manager:
     transfers a first tag from a second computer resource to the first computer resource;
     identifies the first tag as assigned to a first computer resource;
     determines whether a first consumer is associated with the first tag;
     enables the first consumer to access the first computer resource if the first consumer is associated with the first tag; and
     prevents the first consumer from accessing the first computer resource if the first consumer is not associated with the first tag wherein the computer resources comprise copies of datastores, the first computer resource comprises a first copy of a datastore maintained by first computing resources of the computer system, and the second computer resource comprises a second copy of the datastore maintained by second computing resources of the computer system.

2. The method of claim 1, wherein the consumers comprise host computers, and the first consumer comprises a host computer in the second computing resources.

3. The method of claim 2, wherein the host computers execute hypervisors and the resource manager enables the first consumer to access the first computer resource if the first consumer is associated with the first tag by mounting the first copy of the VM datastore in a hypervisor executing in the host computer.

4. The method of claim 1, wherein the first computing resources comprise recovery computing resources, the second computing resources comprise production computing resources, and the resource manager comprises a first recovery manager associated with the production computing resources and a second recovery manager associated with the recovery computing resources, the first and second recovery managers executing a disaster recovery (DR) workflow to perform the identifying, the determining, the enabling, and the preventing.

5. The method of claim 1, wherein the computer resources are divided into groups, each of the groups being assigned a tag category, and wherein the first computer resource is assigned a first tag category, the first tag being selected from the first tag category.

6. The method of claim 1, wherein the resource manager:
   identifies at least one additional tag assigned to the first computer resource;
   determines whether at least one additional consumer is associated with the at least one additional tag;

enables the at least one additional consumer to access the first computer resource if the at least one additional consumer is associated with the at least one additional tag; and prevents the at least one additional consumer from accessing the first computer resource if the at least one additional consumer is not associated with the at least one additional tag.

7. A non-transitory computer-readable storage medium comprising instructions, which when executed in a computer system, causes the computer system to carry out a method of mapping computer resources to consumers in a computer system, comprising:

receiving tags assigned to the computer resources at a resource manager executing in the computer system, where the resource manager:

transfers a first tag from a second computer resource to the first computer resource;

identifies the first tag as assigned to a first computer resource;

determines whether a first consumer is associated with the first tag;

enables the first consumer to access the first computer resource if the first consumer is associated with the first tag; and prevents the first consumer from accessing the first computer resource if the first consumer is not associated with the first tag wherein the computer resources comprise copies of datastores, the first computer resource comprises a first copy of a datastore maintained by first computing resources of the computer system, and the second computer resource comprises a second copy of the datastore maintained by second computing resources of the computer system.

8. The non-transitory computer-readable storage medium of claim 7, wherein the consumers comprise host computers, and the first consumer comprises a host computer in the second computing resources.

9. The non-transitory computer-readable storage medium of claim 8, wherein the host computers execute hypervisors and the resource manager enables the first consumer to access the first computer resource if the first consumer is associated with the first tag by mounting the first copy of the VM datastore in a hypervisor executing in the host computer.

10. The non-transitory computer-readable storage medium of claim 7, wherein the computer resources are divided into groups, each of the groups being assigned a tag category, and wherein the first computer resource is assigned a first tag category, the first tag being selected from the first tag category.

11. The non-transitory computer-readable storage medium of claim 7, wherein the resource manager:

identifies at least one additional tag assigned to the first computer resource;

determines whether at least one additional consumer is associated with the at least one additional tag;

enables the at least one additional consumer to access the first computer resource if the at least one additional consumer is associated with the at least one additional tag; and prevents the at least one additional consumer from accessing the first computer resource if the at least one additional consumer is not associated with the at least one additional tag.

12. The non-transitory computer-readable storage medium of claim 7, wherein the computer resources are divided into groups, each of the groups being assigned a tag category, and wherein the first computer resource is assigned a first tag category, the first tag being selected from the first tag category.

13. The non-transitory computer-readable storage medium of claim 7, wherein the first computing resources comprise recovery computing resources, the second computing resources comprise production computing resources, and the resource manager comprises a first recovery manager associated with the production computing resources and a second recovery manager associated with the recovery computing resources, the first and second recovery managers executing a disaster recovery (DR) workflow to perform the identifying, the determining, the enabling, and the preventing.

14. A computer system including a resource manager executing therein, wherein the resource manager is programmed to execute a workflow of steps on computer resources by transferring a first tag from a second computer resource to the first computer resource; receiving tags assigned to the computer resources, identifying the first tag as assigned to a first computer resource, determining whether a first consumer is associated with the first tag, enabling the first consumer to access the first computer resource if the first consumer is associated with the first tag, and preventing the first consumer from accessing the first computer resource if the first consumer is not associated with the first tag wherein the computer resources comprise copies of datastores, the first computer resource comprises a first copy of a datastore maintained by first computing resources of the computer system, and the second computer resource comprises a second copy of the datastore maintained by second computing resources of the computer system.

15. The computer system of claim 14, wherein the computer resources are divided into groups, each of the groups being assigned a tag category, and wherein the first computer resource is assigned a first tag category, the first tag being selected from the first tag category.

16. The computer system of claim 14, wherein the resource manager is further programmed to identify at least one additional tag assigned to the first computer resource; determine whether at least one additional consumer is associated with the at least one additional tag; enable the at least one additional consumer to access the first computer resource if the at least one additional consumer is associated with the at least one additional tag; and prevent the at least one additional consumer from accessing the first computer resource if the at least one additional consumer is not associated with the at least one additional tag.

17. The computer system of claim 14, wherein the computer resources are divided into groups, each of the groups being assigned a tag category, and wherein the first computer resource is assigned a first tag category, the first tag being selected from the first tag category.

18. The computer system of claim 14, wherein the first computing resources comprise recovery computing resources, the second computing resources comprise production computing resources, and the resource manager comprises a first recovery manager associated with the production computing resources and a second recovery manager associated with the recovery computing resources, the first and second recovery managers executing a disaster recovery (DR) workflow to perform the identifying, the determining, the enabling, and the preventing.

* * * * *